United States Patent Office 3,013,030
Patented Dec. 12, 1961

3,013,030
MANGANESE SALTS OF PREGNANE SERIES
STEROID 21-PHOSPHATES
George A. Bailey, Roselle, N.J., assignor to Merck & Co.,
Inc., Rahway, N.J., a corporation of New Jersey
No Drawing. Filed Dec. 12, 1957, Ser. No. 702,221
5 Claims. (Cl. 260—397.45)

This invention relates to phosphates of anti-inflammatory steroids and more particularly to the manganese salts of steroid phosphates.

The probable general formula of the compounds of the present invention may be represented by either of the formulas

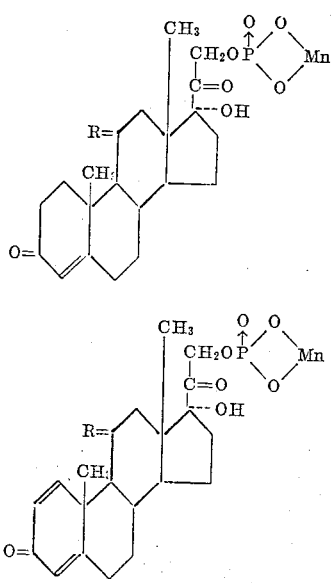

where R is either β-hydroxyl

or keto (O=).

Specific compounds according to this invention includes cortisone-21-phosphate manganese salt, hydrocortisone-21-phosphate manganese salt, prednisone-21-phosphate manganese salt, and prednisolone-21-phosphate manganese salt.

Cortisone-like anti-inflammatory activity with a very low incidence of side reactions as compared to previously-known anti-inflammatory agents is characteristic of the compounds of this invention. Unlike the corresponding free acid esters, these compounds are water-insoluble and are therefore advantageous where repository or long-lasting action is desired.

The compounds of the present invention may be incorporated in ointments for topical application. A further use for the compounds of the present invention is as chemical intermediates in the recovery of the corresponding pure free acid esters from aqueous solutions. An advantage in using the compounds of the present invention for the recovery of pure acid esters such as prednisolone-21-dihydrogen phosphate is that it is not necessary to evaporate water or solvent to obtain the acid ester in pure form.

The compounds of the present invention may be made from the corresponding 21-phosphate acid esters, e.g. cortisone-21-dihydrogen phosphate, hydrocortisone-21-dihydrogen, phosphate, prednisone-21-dihydrogen, and prednisolone-21-dihydrogen phosphate. The synthesis of the latter two compounds is described in Sarett, U.S. Patent 2,789,117, issued April 16, 1957. The starting materials, cortisone-21-dihydrogen phosphate and hydrocortisone-21-dihydrogen phosphate may also be prepared by the methods described in the Sarett patent using appropriate starting materials.

An alternative synthesis of the compounds of the present invention uses as its starting material the 21-iodo compound corresponding to the desired product. Thus, for example, hydrocortisone-21-phosphate manganese salt may be prepared from 21-iodo-4-pregnene-11β,17α-diol-3,20-dione. The other compounds according to this invention may also be prepared from the corresponding 21-iodo compounds. A synthesis of 21-iodo-Δ⁴-pregnene-11β,17α-diol-3,20-dione, which is also applicable to the synthesis of the other 21-iodo compounds which are useful as starting materials, is described in Bergstrom et al., U.S. Patent 2,684,968, issued July 27, 1954.

Starting with the 21-iodo compound, the 21-dihydrogen phosphate ester is prepared by reaction with silver phosphate and excess phosphoric acid. The inorganic phosphate is removed from solution by addition of silver nitrate or by contact with an anion-exchange resin. Then a water-soluble manganese salt such as manganous chloride, manganous sulfate, or manganous acetate is added to the aqueous solution of 21-dihydrogen-phosphate to precipitate the manganese salt of the steroid-phosphate. This synthesis using the preparation of prednisolone-21-phosphate manganese salt from 21-iodo-Δ¹,⁴-pregnadiene-11β,17α-diol-3,20-dione as an example may be illustrated as follows:

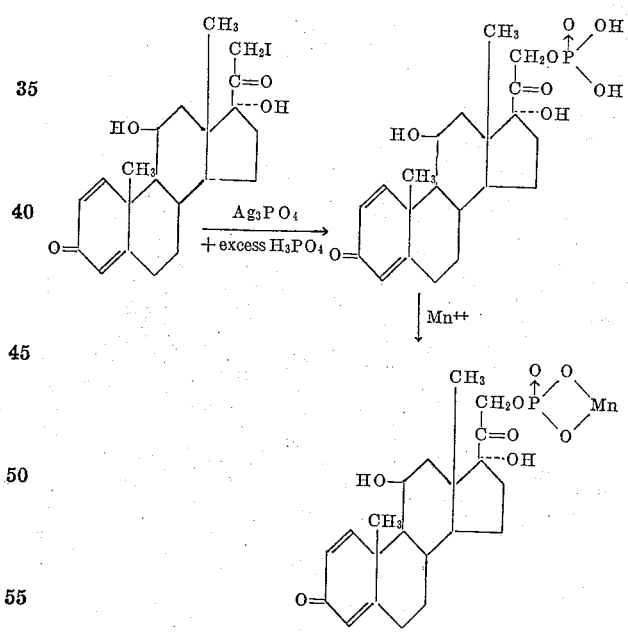

The steroid phosphate manganese salts formed according to the present invention may be converted to the corresponding free acids in pure form by reaction with a suitable acidification agent. This synthesis constitutes a useful means of obtaining the pure free acids from impure solutions of the same containing inorganic phosphate. The preferred acidification agent is a strongly acidic ion-exchange resin in its hydrogen form, such as "Amberlite IR-120" made by Rohm and Haas, Philadelphia, Pennsylvania. Other strongly acidic ion-exchange resins in the hydrogen form may also be used. The steroid-21-dihydrogen phosphate thus formed may be converted to a coeresponding alkali metal salt. The formation of the free acid and its conversion to the monosodium salt are illustrated in the equation below, which shows the formation of prednisolone-21-dihydrogen phosphate and its monosodium salt:

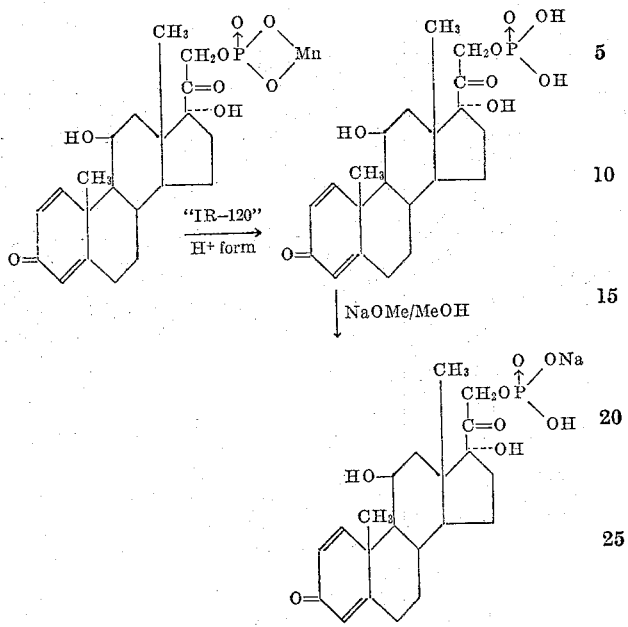

The conversion of the free acid to the sodium salt is preferably carried out with sodium methoxide in a suitable anhydrous organic solvent such as methanol or other lower aliphatic alcohol. The final pH of the monosodium salt is about 5.2 to 5.5. The disodium salt can be obtained by neutralizing to a pH of about 9.2 to 9.6. Either of these salts may be recovered from the reaction medium by precipitation with ether.

The preparation of the manganese steroid phosphates of this invention and their conversion to the corresponding pure free acid phosphate will now be described with respect to specific embodiments in the examples which follow:

EXAMPLE 1

*Preparation of prednisolone-21-dihydrogen phosphate*

Twelve and eight-tenths grams of silver phosphate and 5.3 ml. of 85% phosphoric acid were mixed in a mortar and transferred to a 250-ml., three-neck, round-bottomed flask. To this mixture was added 80 ml. of acetonitrile with stirring, and the flask was swept with nitrogen. The 6.4 g. of diatomaceous earth filter aid ("Supercel") was added, and the flask was again flushed with nitrogen. To this mixture was added 8 g. of 21-iodo-$\Delta^{1,4}$-pregnadiene-11$\beta$,17$\alpha$-diol-3,20-dione. The reagent mixture was heated to boiling under positive nitrogen pressure and held at reflux for three hours and 10 minutes. During the reflux period the mixture turned from a grey to a greenish-yellow color. After reflux the mixture was stirred for one hour while cooling to room temperature. The reaction mixture was quenched by adding 80 ml. of ice water and stripping off the acetonitrile under vacuum at a temperature below 25° C. After the acetonitrile had been stripped off, 34 g. of silver nitrate was added to precipitate silver phosphate. The pH of the reaction mixture was adjusted to 10 by the addition of 24.6 ml. of 30% sodium hydroxide. The reaction mixture was held at pH 10 for about 30 minutes and then adjusted to pH 7.0 by the addition of dilute nitric acid. The reaction mixture was filtered on a filter precoated with diatomaceous earth ("Supercel"). The filter cake was washed five times with water until very little ultra-violet absorbing material was observed in the wash water. A brown filtrate was collected. Sixty millimeters of saturated sodium chloride solution was added to the filtrate to precipitate silver chloride. This mixture was filtered and washed with a small volume of water. The volume of the filtrate was 1,230 ml. This filtrate contained 4.2 mg./ml., or 5.16 g., of prednisolone-21-dihydrogen phosphate.

EXAMPLE 2

*Preparation of prednisolone-21-dihydrogen phosphate manganese salt*

One-half of the filtrate of Example 1 was converted to the manganese salt by the addition of 9.9 g. (a ten-fold excess) of manganous sulfate in aqueous solution. The pH was adjusted to 7.0 by the addition of 5 ml. of 30% sodium hydroxide. The mixture was stirred for two hours and filtered, and the filter cake washed with water. The filter cake, which was prednisolone-21-phosphate manganese salt, was dried to constant weight. Yield 4.0 g.

EXAMPLE 3

*Conversion of prednisolone-21-phosphate manganese salt to free acid*

Four grams of prednisolone-21-phosphate manganese salt was slurried in 400 ml. of methanol and 160 ml. of "Amberlite IR-120" ion-exchange resin on the acid cycle. The mixture was stirred for about 15 hours at room temperature, filtered, and washed with methanol. The combined volume of filtrate and washes was 665 ml. The concentration of prednisolone-21-dihydrogen-phosphate in the filtrate was found to be 2.61 mg./ml. This represented a yield of 1.73 g. of prednisolone-21-dihydrogen phosphate.

While this invention has been described with reference to specific embodiments thereof, for purposes of illustration, it is understood that the scope of the invention shall be limited only by the scope of the appended claims.

What is claimed is:

1. A compound having a general formula of the group consisting of

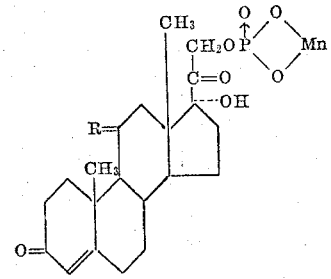

and

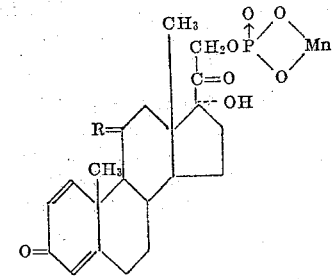

where R is selected from the group consisting of $\beta$-hydroxyl and keto.

2. Cortisone-21-phosphate manganese salt.
3. Hydrocortisone-21-phosphate manganese salt.
4. Prednisone-21-phosphate manganese salt.
5. Prednisolone-21-phosphate manganese salt.

References Cited in the file of this patent

UNITED STATES PATENTS

| | | |
|---|---|---|
| 2,609,389 | Flenner | Sept. 2, 1952 |
| 2,779,775 | Sarett | Jan. 29, 1957 |
| 2,789,117 | Sarett | Apr. 16, 1957 |
| 2,870,177 | Conbere et al. | Jan. 20, 1959 |
| 2,938,916 | Christensen et al. | May 31, 1960 |